(12) United States Patent
Yamada et al.

(10) Patent No.: US 7,639,390 B2
(45) Date of Patent: Dec. 29, 2009

(54) IMAGE PROCESSING APPARATUS, IMAGE PROCESSING METHOD, STORAGE MEDIUM, AND PROGRAM

(75) Inventors: Osamu Yamada, Tokyo (JP); Makoto Torigoe, Tokyo (JP); Yuji Akiyama, Kanagawa (JP); Takuya Shimada, Kanagawa (JP); Hirochika Matsuoka, Kanagawa (JP); Takahisa Akaishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1026 days.

(21) Appl. No.: 10/347,936

(22) Filed: Jan. 22, 2003

(65) Prior Publication Data

US 2003/0142377 A1 Jul. 31, 2003

(30) Foreign Application Priority Data

Jan. 25, 2002 (JP) .............................. 2002-017444

(51) Int. Cl.
*G06F 15/00* (2006.01)

(52) U.S. Cl. ..................... 358/1.9; 358/504; 358/521; 358/527; 358/406; 358/452; 715/527

(58) Field of Classification Search ............... 358/521, 358/1.9, 504, 527, 406, 452; 715/527
See application file for complete search history.

(56) References Cited

U.S. PATENT DOCUMENTS

| | | | | |
|---|---|---|---|---|
| 5,574,664 A * | 11/1996 | Feasey | .............. | 702/107 |
| 5,742,296 A | 4/1998 | Yamada et al. | .............. | 345/431 |
| 5,754,682 A * | 5/1998 | Katoh | .............. | 382/162 |
| 5,933,252 A | 8/1999 | Emori et al. | .............. | 358/500 |
| 5,956,015 A * | 9/1999 | Hino | .............. | 345/600 |
| 6,067,406 A * | 5/2000 | Van Hoof et al. | .............. | 358/1.9 |
| 6,231,246 B1 * | 5/2001 | Takeo et al. | .............. | 358/1.2 |
| 6,320,676 B1 * | 11/2001 | Yoshidome | .............. | 358/1.9 |
| 6,642,930 B1 | 11/2003 | Matsuura et al. | .............. | 345/601 |
| 6,831,755 B1 * | 12/2004 | Narushima et al. | .............. | 358/1.9 |
| 6,952,288 B2 * | 10/2005 | Yamada et al. | .............. | 358/1.9 |
| 7,057,766 B1 * | 6/2006 | Inoue | .............. | 358/1.9 |
| 7,102,648 B1 * | 9/2006 | Holub | .............. | 345/589 |
| 7,221,464 B2 * | 5/2007 | Yamano | .............. | 358/1.13 |
| 2001/0007599 A1 | 7/2001 | Iguchi et al. | .............. | 382/274 |

(Continued)

FOREIGN PATENT DOCUMENTS

JP      6-62249      3/1994

(Continued)

*Primary Examiner*—David K. Moore
*Assistant Examiner*—Benjamin O Dulaney
(74) *Attorney, Agent, or Firm*—Fitzpatrick, Cella, Harper & Scinto

(57) ABSTRACT

When an output image is observed, an image processing apparatus by which image observation can be performed always in a satisfactory state irrespective of its observation environment and a change of a human's visual characteristic is provided. In this image processing apparatus, a first output unit outputs the target image in a first gradation reproduction range, and a second output unit outputs the target image output by the first output unit in a second gradation reproduction range. At this time, a correction unit performs a correction process, i.e., gradation conversion process, to the target image output by the second output unit, on the basis of information concerning the environment for observing the output result of the target image by the second output unit.

6 Claims, 13 Drawing Sheets

U.S. PATENT DOCUMENTS

| | | | |
|---|---|---|---|
| 2001/0048733 A1* | 12/2001 | Schulze-Ganzlin | 378/62 |
| 2001/0052971 A1 | 12/2001 | Tsuchiya et al. | 355/77 |
| 2002/0036780 A1* | 3/2002 | Nakamura | 358/1.2 |
| 2002/0044292 A1* | 4/2002 | Yamada et al. | 358/1.9 |
| 2002/0060803 A1 | 5/2002 | Iida et al. | 358/1.13 |
| 2002/0101456 A1 | 8/2002 | Matsuoka et al. | 345/848 |
| 2002/0122196 A1* | 9/2002 | Cordery et al. | 358/1.11 |
| 2003/0052894 A1 | 3/2003 | Akiyama et al. | 345/589 |
| 2003/0076420 A1 | 4/2003 | Akiyama et al. | 348/207.1 |
| 2003/0161530 A1 | 8/2003 | Yamada et al. | 382/167 |
| 2004/0125388 A1* | 7/2004 | Piatt et al. | 358/1.9 |
| 2005/0219663 A1* | 10/2005 | Yamada et al. | 358/521 |

FOREIGN PATENT DOCUMENTS

| | | |
|---|---|---|
| JP | 9-93451 | 4/1997 |
| JP | 10-322566 | 12/1998 |
| JP | 2000-263151 A | 9/2000 |

* cited by examiner

| OUTPUT PAPER KIND | OBSERVATION-ENVIRONMENT-DISCRETE GAMMA INDEX |
|---|---|
| PLAIN PAPER | 1.0 |
| COATED PAPER | 1.0 |
| GLOSSY PAPER | 1.0 |
| OHP PAPER | 0.8 |
| FILM PAPER | 0.67 |
| OTHER | 1.0 |

| ENVIRONMENT STATE | OBSERVATION-ENVIRONMENT-DISCRETE GAMMA INDEX |
|---|---|
| LIGHT | 1.0 |
| DARKISH | 0.8 |
| PITCH-DARK | 0.67 |
| OTHER | 1.0 |

| ILLUMINANCE | OBSERVATION-ENVIRONMENT-DISCRETE GAMMA INDEX |
|---|---|
| 100lx – | 1.0 |
| 10lx – 100lx | 0.8 |
| – 10lx | 0.67 |

IMAGE PROCESSING APPARATUS, IMAGE PROCESSING METHOD, STORAGE MEDIUM, AND PROGRAM

BACKGROUND OF THE INVENTION

1. Field of the Invention

The present invention relates to a technique to perform a gradation conversion process to an image so as to output the image and observe the output image.

2. Related Background Art

Conventionally, for example, in a personal computer in which a printer driver has been installed, when an image displayed on a monitor is output and printed by a printer, it is necessary for a user to adjust brightness of the image to be displayed (called a target image hereinafter) in a printed material (i.e., an output image) output by the printer. In order to do so, the user has to set automatic setting for the printer driver to automatically perform the brightness adjustment of the target image, set desired setting on adjustment setting items displayed on the personal computer to manually perform the brightness adjustment of the target image, or select an output gamma value.

Thus, on the basis of the automatic setting, the user's manual setting, or the selected output gamma value, the printer driver obtains a print density of the image in the printer corresponding to brightness of the image on the monitor, and calculates a gradation correction curve from the obtained print density. Then, the printer driver corrects the target image on the basis of the calculated gradation correction curve, whereby the brightness of the target image in the print output (i.e., image output) by the printer is adjusted.

On one hand, it has been conventionally known that sight of an image when observing the result (i.e., a printed material) output and printed by the printer is highly influenced by its observation environment. Particularly, with respect to the contrast and the brightness of the image, a human's visual characteristic changes in three environments (1) to (3) as follows. That is, the human's visual characteristic changes in (1) a pitch-dark state in such a case where a viewer observes a slide image or a projector image, (2) a darkish state in such a case where a viewer observes an OHP (overhead projector) sheet, and (3) a bright state or a light state which is known as an ordinary observation environment.

For example, even if there are two printed materials on which the images having the same gradation characteristic have been respectively output and printed, the contrast of the image on the printed material which is observed when the observation environment is the pitch-dark state is viewed as if it is lower than that of the image on the printed material which is observed when the observation environment is the bright state. Moreover, when the observation environment is the darkish state, it is said that a visual characteristic which is intermediate between two visual characteristics as above appears.

However, a conventional apparatus or system which performs such a gradation correction process (i.e., a gradation conversion process) is structured to set a gradation correction curve to be used in the gradation conversion process to the target image without considering the observation environment in case of observing the printed material of the target image, the fact that the human's visual characteristic changes according to the observation environment, and the like. Otherwise, the conventional apparatus or system is structured to set the gradation correction curve in the state that the observation environment in case of observing the printed material of the target image, the fact that the human's visual characteristic changes according to the observation environment, and the like can not be considered. In addition, the conventional apparatus or system is structured to set the gradation correction curve to be used in the gradation conversion process for the target image without considering the relation between a gradation range capable of performing image output by the monitor and a gradation range capable of performing image output by the printer.

Therefore, conventionally, when the printed material is observed, there may be a case where it is very difficult for a user to view or observe the printed material according to an environment at this time or a change of the user's visual characteristic.

For example, when a printed material (i.e., a print-output image) is observed in the dark observation environment, the contrast of the image is visually low or visually too dark as compared with the case where the image displayed on the display is observed. On the other hand, when the printed material is observed in the light observation environment, the contrast of the image is visually high or visually too bright as compared with the case where the image displayed on the display is observed.

Moreover, as a structure to set a gradation correction curve which paid attention to the relation between the gradation ranges of two output devices (e.g., a monitor and a printer), for example, there is the structure which is described in Japanese Patent Application No. 2000-263151. This structure is to set the gradation correction curve under the condition of paying attention only to the gradation range, but is not to set the gradation correction curve under the condition of considering an observation environment and a change of the visual characteristic of a viewer. Thus, according to this structure, there is no problem in an ordinary observation environment, but such a problem as above that it is difficult to view the image occurs if the observation environment changes.

SUMMARY OF THE INVENTION

The present invention has been made to solve such a problem as above, and an object thereof is to provide an image processing apparatus which can perform, in case of observing an output image, image observation always in a satisfactory state irrespective of an observation environment and a change of human's visual characteristic, an image processing system which includes the image processing apparatus as above, an image processing method which is applied to the image processing apparatus as above, a computer-readable storage medium which stores a program to execute the image processing method as above, and the program itself.

More specifically, for example, by adopting a structure which can change a gradation reproduction characteristic of print output according to an observation environment for observing a print-output image by a printer (i.e., an output image), even if the observation environment changes, a gradation characteristic of the image displayed on a monitor can be represented with a gradation characteristic of the print-output image by the printer.

In order to achieve the above object, the present invention provides an image processing apparatus which performs a correction process to a target image output by a first output means having a first gradation reproduction range and then outputs the corrected target image by using a second output means having a second gradation reproduction range, comprising a processing means for performing the correction process to the target image on the basis of observation environment information concerning an environment for observing at least an output result of the target image by the second output means.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Hereinafter, the embodiments of the present invention will be explained with reference to the attached drawings.

First Embodiment

Figure 1:
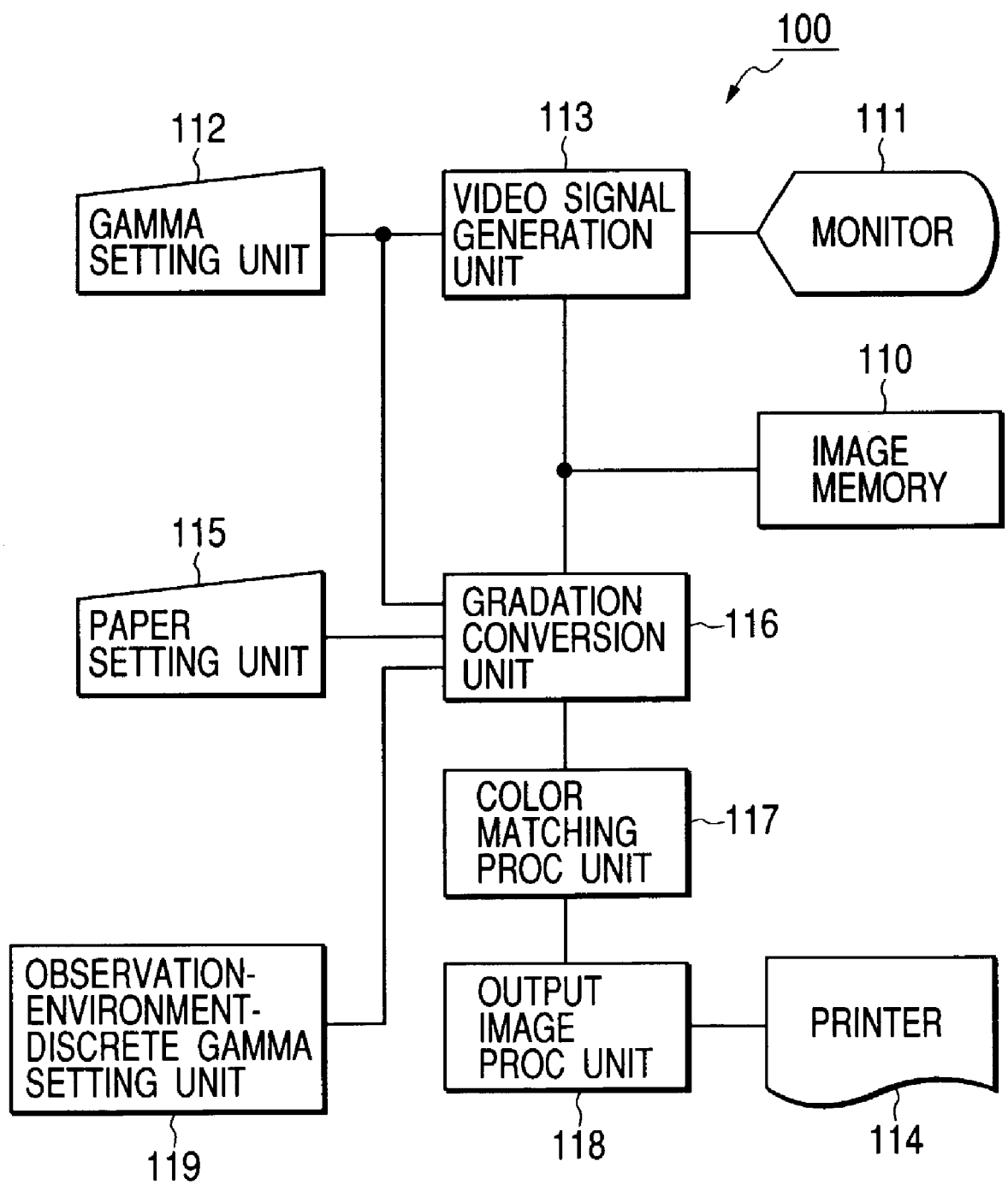
FIG. 1 is a block diagram showing the structure of an image processing apparatus according to the first embodiment of the present invention.

The first embodiment of the present invention is applied to, e.g., an image processing apparatus 100 shown in FIG. 1.

The image processing apparatus 100 in the present embodiment can display a target image, to which a gradation conversion process was executed, by a monitor 111 and can perform a print output by a printer 114 according to activation of a printer driver. Especially, it is structured to execute the gradation conversion process in accordance with environment of observing a print output result (printed material) obtained by the printer 114.

Hereinafter, the structure and operation of the image processing apparatus 100 according to the present embodiment will be concretely explained.

<Structure of Image Processing Apparatus 100>

As shown in FIG. 1, the image processing apparatus 100 consists of an image memory 110 for storing image data, the monitor 111 for displaying an image on the basis of a video signal from a video signal generation unit 113, a gamma setting unit 112 for setting a display characteristic (gamma value) of the monitor 111, the video signal generation unit 113 for converting the image data into the video signal on the basis of the gamma value set by the gamma setting unit 112, the printer 114 for performing a print output (printing) of an image on the basis of a printer drive signal sent from an output image processing unit 118, a paper setting unit 115 for setting kind of print paper to be used in the printer 114, a gradation correction (conversion) unit 116 for performing a gradation matching between a display output on the monitor 111 and the print output in the printer 114, a color matching process unit 117 for performing a color matching between the display output on the monitor 111 and the print output in the printer 114, the output image processing unit 118 for converting the image data into the printer drive signal and a gamma setting unit 119 for setting a gamma value for each observation environment (hereinafter, called an observation-environment-discrete gamma setting unit 119) for setting a gamma index for each observation environment (hereinafter, called an observation-environment-discrete gamma index).

In the above structure, image data digitized by a digital camera, a scanner or the like, or image data created by a CG (computer graphics) method is stored in the image memory 110 as a pixel value of corresponding to brightness.

Here, the pixel value to be stored in the image memory 110 is assumed as eight-bit value of red (R), green (G) and blue (B), and a pixel value of 255 corresponds to the maximum brightness and a pixel value of 0 corresponds to the minimum brightness.

The monitor 111 is composed of a display unit such as a CRT, an LCD or the like. In the monitor 111, the relationship between intensity of the video signal (drive signal) generated by the video signal generation unit 113 and brightness Y is expressed by the following expression (1).

$$Y = V \gamma^{monitor} \qquad (1)$$

The video signal generation unit 113 generates the video drive signal V corresponding to a pixel value I of structuring a target image (image data stored in the image memory 110) by using a D/A converter (not shown). At this time, in a case where the relationship (input characteristic of D/A converter) between the pixel value I and the video drive signal V is expressed by the following expression (2), $$V = (I/255)^{1/\gamma^{video}} \qquad (2)$$

the relationship between the pixel value I and a brightness value Y of an image to be displayed on the monitor 111 is expressed by the following expression (3).

$$Y=(I/255)\gamma^{monitor}\gamma^{video}=(I/255)\gamma \quad (3)$$

In the present embodiment, it is assumed that an input characteristic (see above expression (2)) of the D/A converter (not shown) in the video signal generation unit 113 is adjusted such that the relationship between the pixel value I and the brightness value Y of the image to be displayed on the monitor 111 becomes the gamma value γ set by the gamma setting unit 112.

The printer 114 which is, for example, a printer of an inkjet system discharges ink droplets of cyan (C), magenta (M), yellow (Y) and black (K) on a paper used for a print output and fixes the ink droplets. Light and shade of color is represented by density of the ink droplets.

In the printer 114, plural kinds of papers such as a plain paper, a coated paper, a glossy paper and the like can be selected. The kind of paper is instructed by the paper setting unit 115.

The output image processing unit 118 controls discharging of each ink of C, M, Y and K colors in the printer 114 on the basis of a RGB pixel value of structuring input image data (image to be print output by the printer 114). Accordingly, in the printer 114, the corresponded color is reproduced on the paper.

<Entire Operation of Image Processing Apparatus 100>

Figure 2:
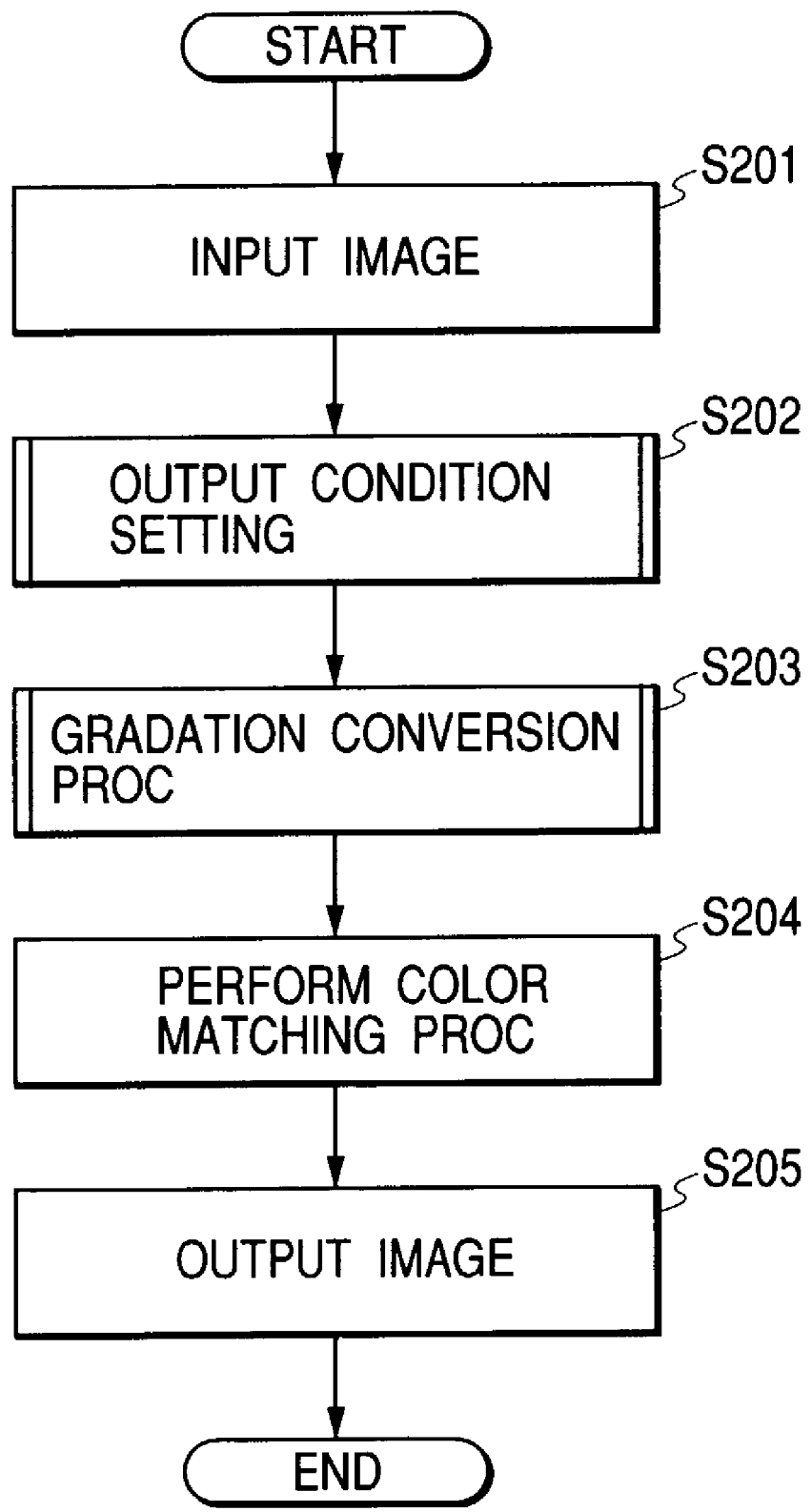
FIG. 2 is a flow chart for explaining an entire operation of the image processing apparatus.

FIG. 2 is a flow chart showing a series of operations from an input of an image, to which a process is executed (target image), to a print output in the printer 114 performed in the image processing apparatus 100.

In a step S201, when target image data is input to the image processing apparatus 100, the target image data is stored in the image memory 110.

In a step S202, as an output condition setting, the gamma setting unit 112 sets, for example, the gamma value γ of the monitor 111, to which the gradation matching is to be performed in the gradation correction unit 116, on the basis of an operation instruction or the like issued from a user. The paper setting unit 115 sets the kind of paper on the basis of the operation instruction or the like issued from the user.

In a step S203, the gradation conversion unit 116 executes a gradation conversion process corresponded to observation environment indicated by an expression (5) or (6) described later to the target image data stored in the image memory 110 on the basis of the output condition set in the step S202.

In a step S204, the color matching process unit 117 executes a color matching process between the display output on the monitor 111 and the print output by the printer 114 to the target image data which was processed in the gradation conversion unit 116.

In a step S205, the output image processing unit 118 converts the target image data which was processed in the color matching process unit 117 into the printer drive signal, which is output to the printer 114. According to the above process, a printing process of the target image data is executed in the printer 114.

<Output Condition Setting Process>

Here, the output condition setting process to be executed in the step S202 shown in FIG. 2 will be concretely explained.

Figure 3:
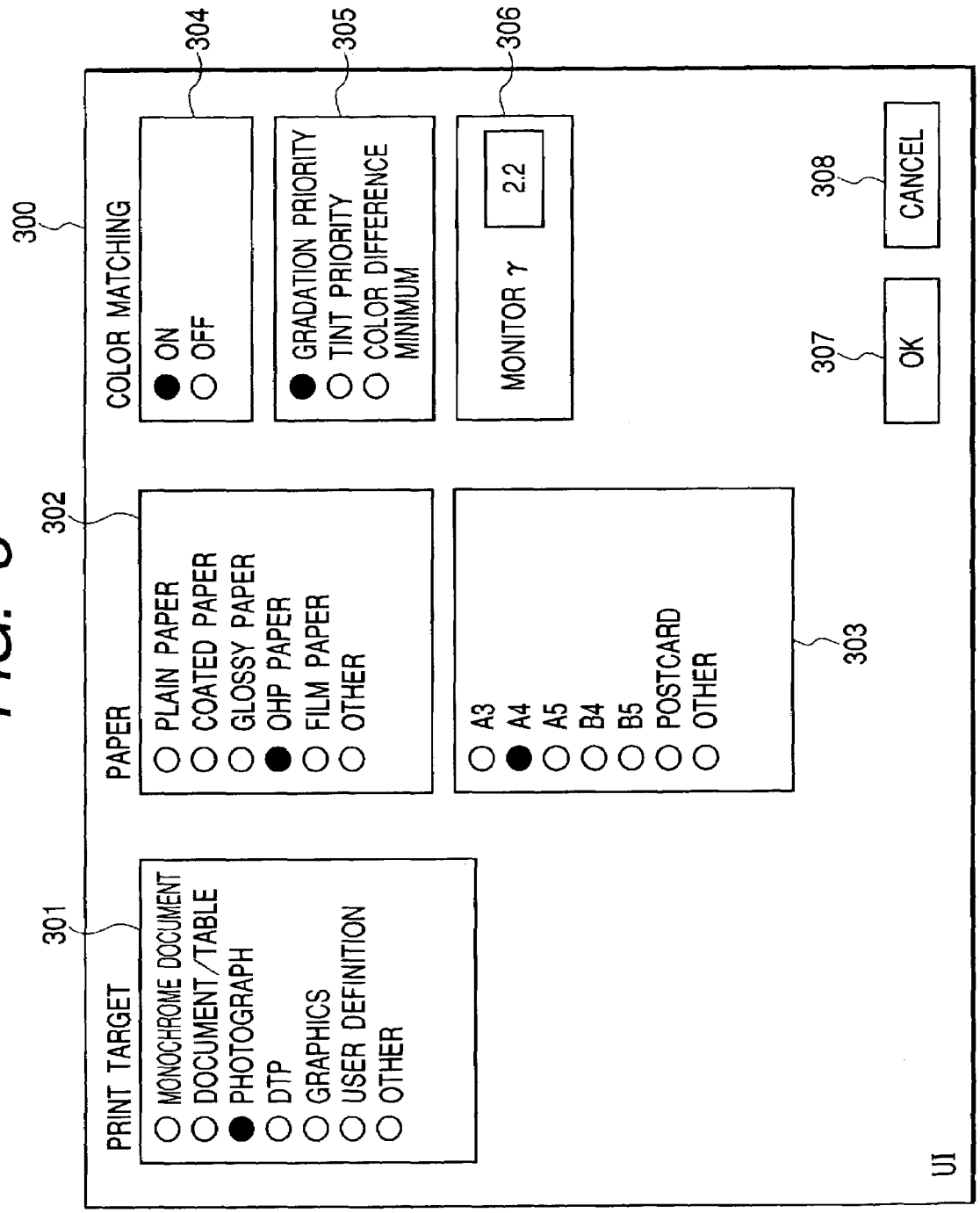
FIG. 3 is a view for explaining an UI (user interface) used for setting an image output condition (i.e., observation environment information) in the image processing apparatus.

FIG. 3 is a view showing an example of a user interface 300 of the printer driver to be activated in the image processing apparatus 100.

For example, the gamma setting unit 112 sets the gamma value γ of the monitor 111, to which the gradation matching is performed in the gradation correction unit 116, on the basis of information set from the user by using the user interface 300 shown in FIG. 3. The paper setting unit 115 sets the kind of paper on the basis of information set from the user by using the user interface 300.

As shown in FIG. 3, the user interface 300 includes a print target setting unit 301 for setting a print target of the target image, a paper kind setting unit 302 for setting the kind of paper to be used in the printer 114, a paper size setting unit 303 for setting the size of paper to be used in the printer 114, a color matching setting unit 304 for setting whether or not the color matching process is executed to the target image (image to be print output), a color matching method setting unit 305 for setting the kind of color matching, a target gamma setting unit 306 for setting a gamma value γp of a matching target, an OK setting unit 307 which is operated when all the setting is terminated and a cancel setting unit 308 which is operated in case of canceling a setting operation.

Then, in case of print outputting the target image by the printer 114, the user sets each item of the user interface 300 so as to obtain a desired output result of the target image, thereafter the OK setting unit 307 is operated (button is depressed). Accordingly, in the image processing unit 100, the output condition setting process (see step S202 in FIG. 2) is executed.

Figure 4:
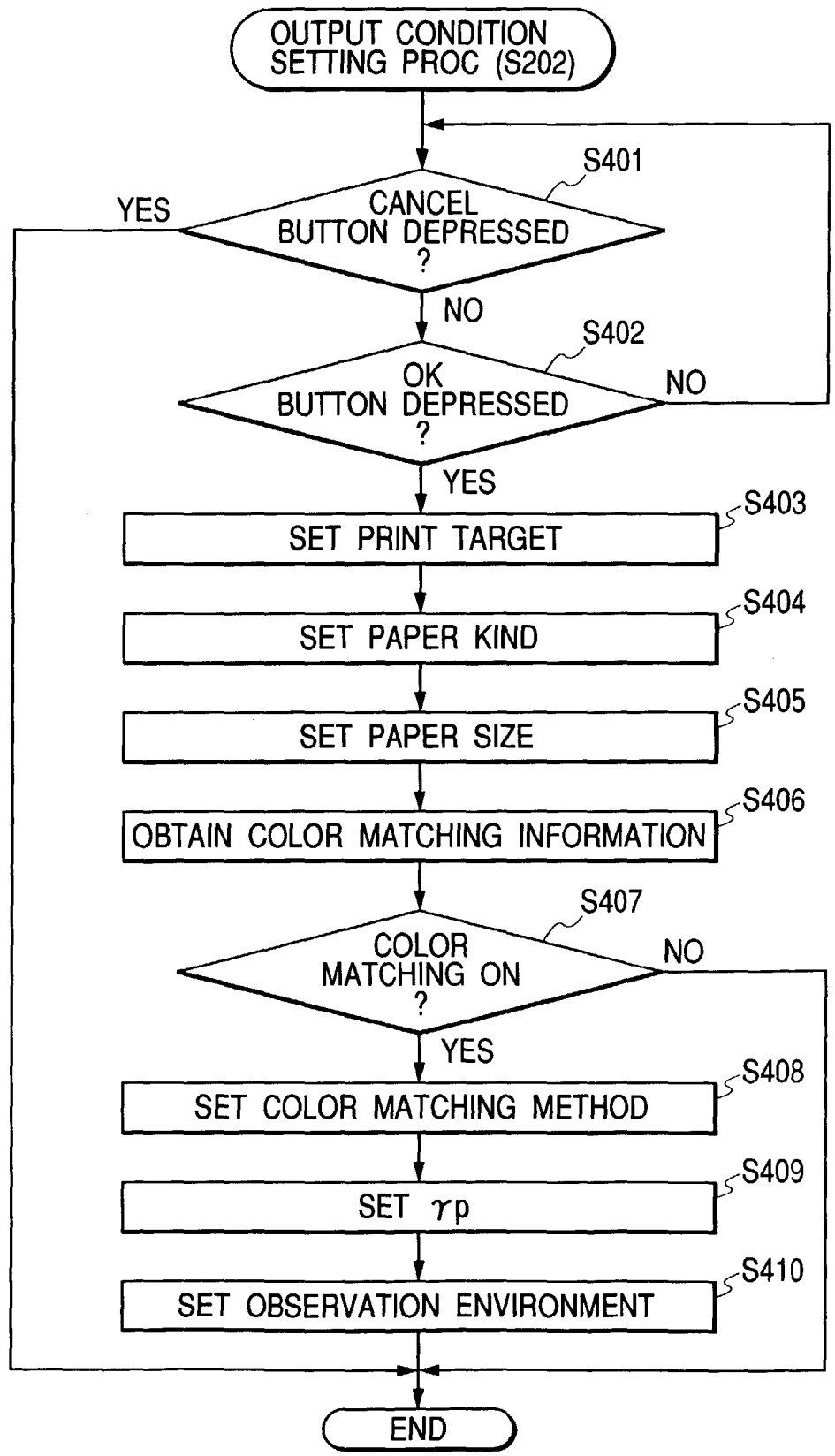
FIG. 4 is a flow chart for explaining an output setting process executed in the entire operation of the image processing apparatus.

FIG. 4 is a flow chart showing the output condition setting process to be executed in the step S202 in FIG. 2.

In a step S401, the printer driver discriminates whether or not the cancel setting unit 308 is operated (whether or not the button is depressed) in the user interface 300 shown in FIG. 3. As a result of the discrimination, when the cancel setting unit 308 is operated, the process is terminated as it is, and when the cancel setting unit 308 is not operated, a flow advances to a next step S402.

As a result of the discrimination in the step S401, when the cancel setting unit 308 is not operated, in the step S402, the printer driver discriminates whether or not the OK setting unit 307 is operated (whether or not the button is depressed) in the user interface 300. As a result of the discrimination, when the OK setting unit 307 is operated, a flow advances to a next step S403, and when the OK setting unit 307 is not operated, the flow returns to the step S401 again.

Next, the following processes are executed in steps S403, S404 and S405. That is, as a result of the discrimination in the step S402, when the OK setting unit 307 is operated, a setting unit which includes the gamma setting unit 112 and the paper setting unit 115 obtains print target information such as monochrome document, document/table, photograph, DTP (desk top publishing), graphics, user definition or the like according to the setting contents set by the print target setting unit 301 in the user interface 300 (step S403). Then, according to the setting contents set by the paper kind setting unit 302, target paper information among plural kinds of papers such as the plain paper, the coated paper, the glossy paper and the like, is obtained (step S404). Further, according to the setting contents set by the paper size setting unit 303, paper size information such as A3, A4, A5, B4, B5, postcard or the like is obtained (step S405).

Next, the following processes are executed in steps S406 and S407. That is, the color matching process unit 117 obtains ON/OFF information of the color matching process according to the setting contents set by the color matching setting unit 304 of the user interface 300 (step S406). According to the obtained information, it is discriminated whether or not the color matching process is in an ON state (step S407).

As a result of the discrimination, when the color matching process is in the ON state, a flow advances to a step S408, and when the color matching process is not in the ON state, the process is terminated as it is.

As a result of the discrimination in the step S407, when the color matching process is in the ON state, in the step S408, the color matching processing unit 117 obtains information of a color matching method such as gradation priority, tint priority, color difference minimum or the like according to the setting contents set by the color matching method setting unit 305 of the user interface 300.

In a step S409, the gamma setting unit 112 obtains the gamma value γp of the monitor 111, to which the color matching process is to be executed, according to the setting contents set by the target gamma setting unit 306 of the user interface 300.

Here, for example, it is assumed that the gamma value γ set in the gamma setting unit 112 is set as an initial value of the target gamma setting unit 306, and the value can be arbitrarily changed according to a user's desire.

In a step S410, the observation-environment-discrete gamma setting unit 119 sets an observation-environment-discrete gamma index S corresponding to the observation environment of observing an output result (print output material) in the printer 114 on the basis of setting information regarding the paper obtained in the paper setting unit 115 (paper setting contents set by the paper kind setting unit 302).

After executing the process in the step S410, the process is terminated.

Figures 5, 6:
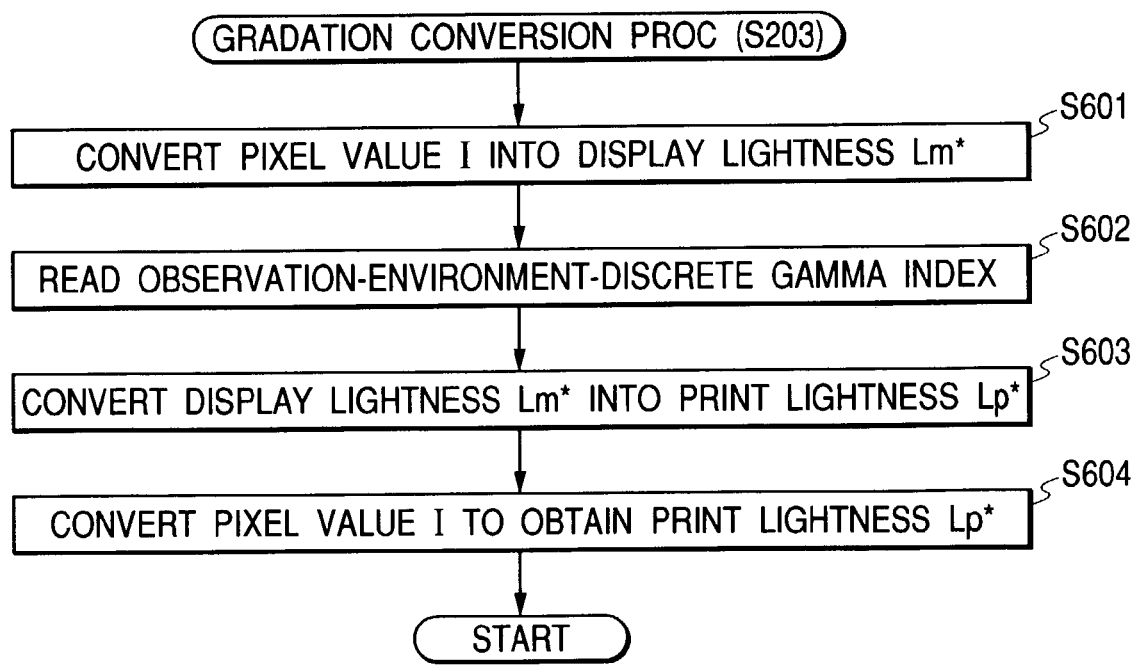
FIG. 5 is a view for explaining the relationship between output paper kind and a gamma index for each observation environment (called an observation-environment-discrete gamma index) in the output setting process.
FIG. 6 is a flow chart for explaining a gradation conversion process executed in the entire operation of the image processing apparatus.

FIG. 5 is a view showing an example of the observation-environment-discrete gamma index S set in the step S410.

The observation-environment-discrete gamma index S shown in FIG. 5 indicates an example when the paper setting contents set by the paper kind setting unit 302 corresponds to the contents shown in FIG. 3. Therefore, since an "OHP paper" is set in the paper kind setting unit 302, a value of 0.8 is to be set as the observation-environment-discrete gamma index S.

<Gradation Conversion Process>

Here, the gradation conversion process to be executed in the step S203 shown in FIG. 2 will be concretely explained.

The gradation conversion unit 116 executes the gradation conversion process corresponding to the observation environment described in the following to the target image data stored in the image memory 110 on the basis of the output condition (output condition including monitor gamma setting, paper setting, observation-environment-discrete gamma setting and the like so as to take gradation matching with an image displayed on the monitor 111) set in the step S202 (see FIG. 4).

Before executing the gradation conversion process to be started from a step S601 explained in the following, the relationship between a pixel value and an output color is previously measured every kind of paper. That is, gray patches of varying the pixel value (R, G, B) from (0, 0, 0) to (255, 255, 255) of 256 stages are output without executing the gradation conversion process, and color of each gray patch is measured by a colorimeter to obtain a relative reflection ratio R standardized by a reflection ratio of a paper surface (reflection ratio "1"). Then, the reflection ratio R is converted into lightness (print lightness) L* by the following expressions (4).

$$L^* = 116R^{1/3} - 16 \ (R > 0.008856)$$

$$L^* = 903.29R \ (R \leq 0.008856) \quad (4)$$

Figure 7:
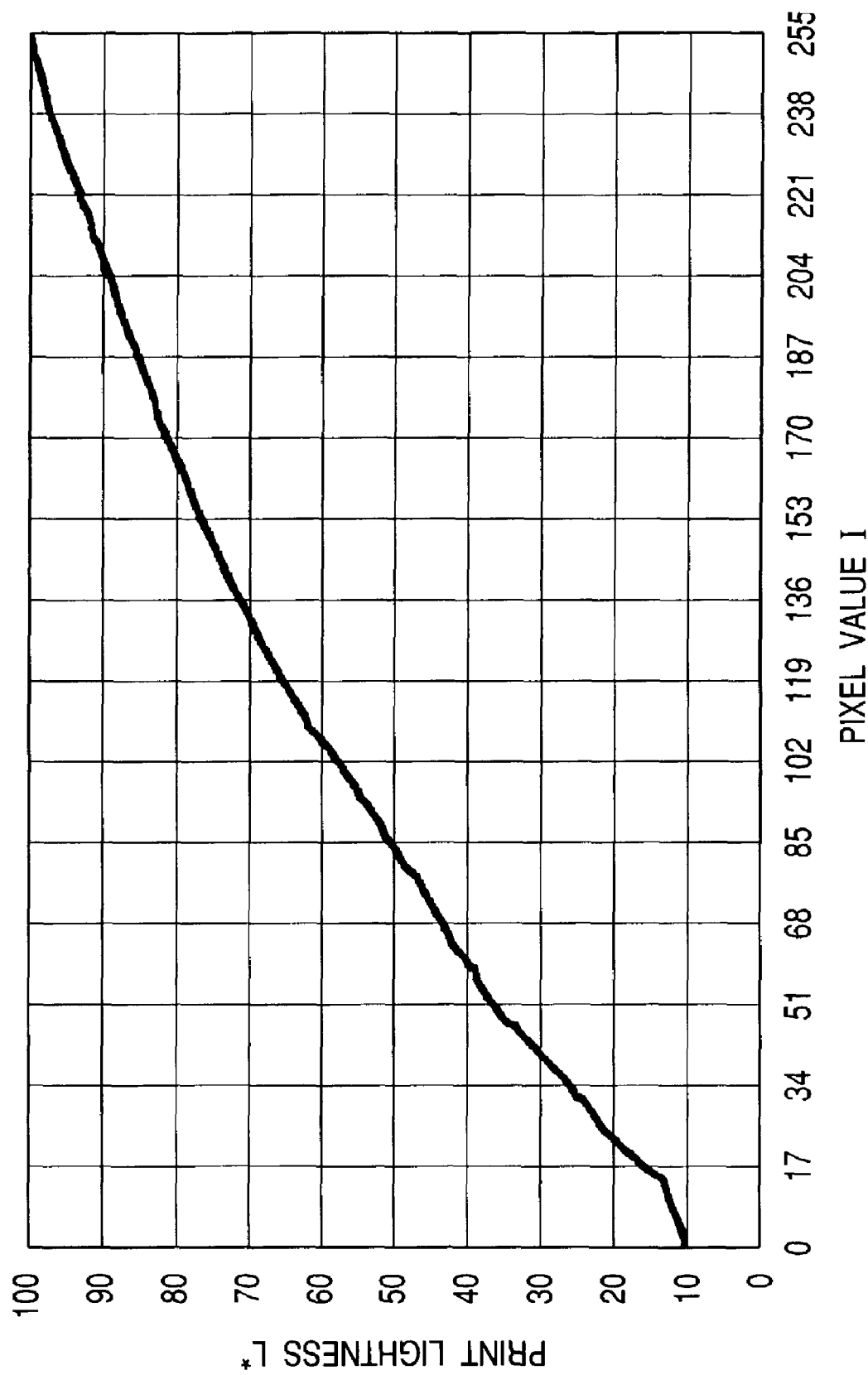
FIG. 7 is a view for explaining an example of a print gradation characteristic in the gradation conversion process.

FIG. 7 is a view showing an example of the relationship between the pixel value I and the print lightness L*.

In the step S601, the gradation conversion unit 116 performs conversion from the pixel value I into lightness Lm* by utilizing a fact that the relationship between the pixel value I and the lightness Lm* of the target image to be displayed by the monitor 111 is indicated by the following expressions (5) according to the gamma value γ.

$$Lm* = 116(Y/YO)^{1/3} - 16 \quad (5)$$
$$= 116(I/255)\gamma/3 - 16 \ (Y/YO > 0.008856)$$
$$Lm* = 903.29(Y/YO)$$
$$= 903.29(I/255)\gamma (Y/YO > 0.008856)$$

In the above expressions (5), symbol "YO" denotes the maximum brightness of the monitor 111, and symbol "Lm*" denotes lightness of the target image to be displayed by the monitor 111.

Figure 8:
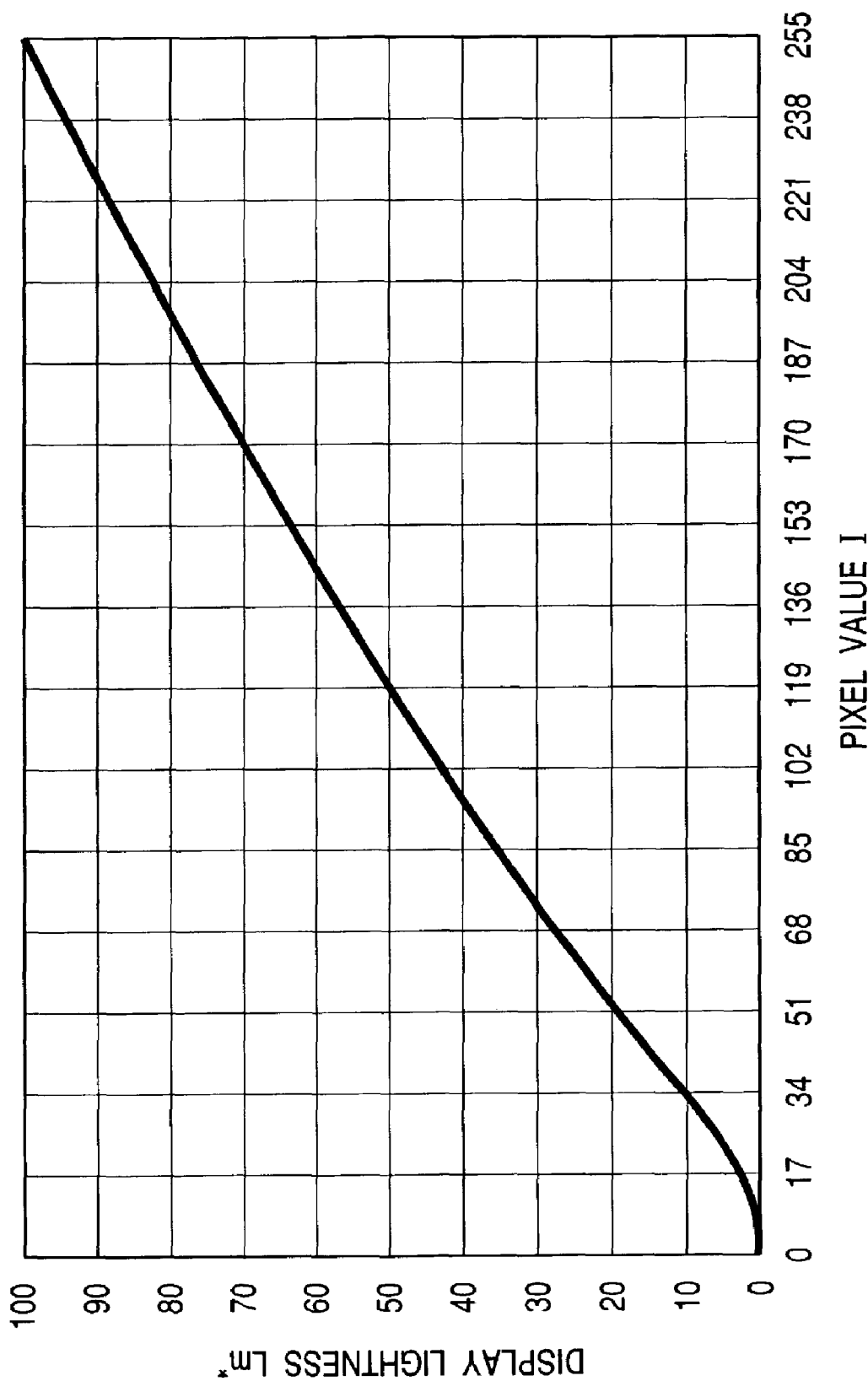
FIG. 8 is a view for explaining an example of a display gradation characteristic in the gradation conversion process.

FIG. 8 is a view showing an example of the relationship between the pixel value I and the display lightness Lm* when the gamma value γ is set as γ=2.2.

In a step S602, the gradation conversion unit 116 obtains the observation-environment-discrete gamma index S from the observation-environment-discrete gamma setting unit 119.

In a step S603, the gradation conversion unit 116 converts the display lightness Lm* obtained in the step S601 into print lightness Lp* on the basis of the observation-environment-discrete gamma index S obtained in the step S602.

Concretely, a lightness area which can be displayed by the monitor 111 is in a range of 0 to 100 as shown in FIG. 8, while a lightness area which can be printed by the printer 114 is in a range of 10 to 100 as shown in FIG. 7. That is, there is difference between the two lightness areas. Therefore, it is required to compress the lightness in order to obtain the print output, which is in a state of gradation matching with a displayed image on the monitor 111, in the printer 114.

Therefore, the gradation conversion unit 116 performs the lightness compression as follows.

That is, in order to compress the lightness area which can be displayed by the monitor 111 in linear to the lightness area which can be printed by the printer 114, a conversion process indicated by the following expression (6) is executed.

$$Lp^* = (Lm^*/100)^S \times 100 \times (L_{max} - L_{min}) + L_{min} \quad (6)$$

In the above expression (6), symbol "S" denotes the observation-environment-discrete gamma index, symbol "$L_{max}$" denotes the maximum lightness which can be displayed, symbol "$L_{min}$" denotes the minimum lightness which can be displayed, and symbol "LP*" denotes the lightness of an image to be printed by the printer 114.

Figure 9:
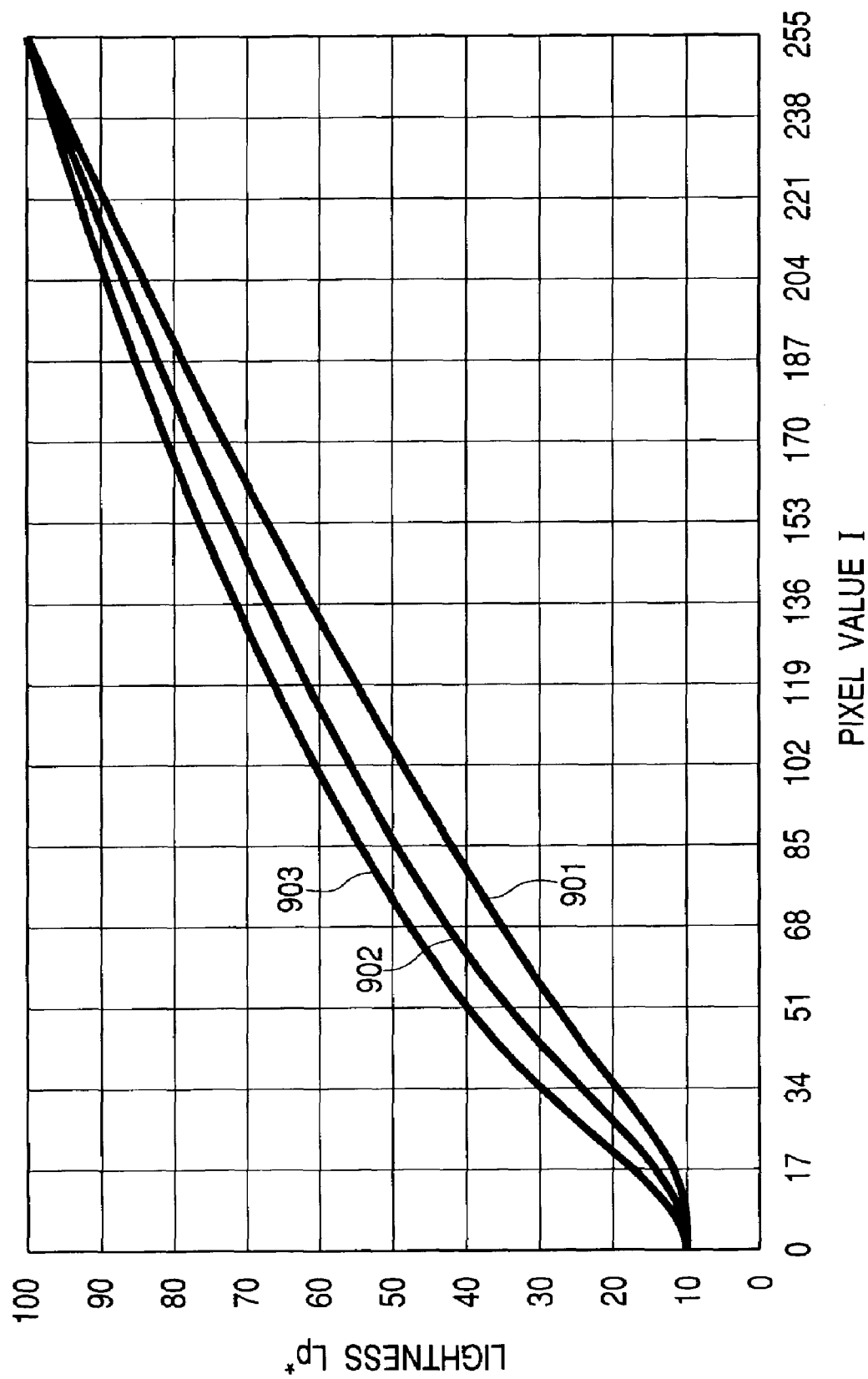
FIG. 9 is a view for explaining an example of a gradation characteristic after performing lightness compression in accordance with an observation environment in the gradation conversion process.

FIG. 9 is a view showing the relationship (output gradation characteristic) between the pixel value I of an image, which is obtained by performing a lightness compression to the target image, and the lightness Lp*.

In FIG. 9, reference numeral 901 denotes a gradation reproduction curve in the light observation environment (ordinary observation environment), reference numeral 902 denotes a gradation reproduction curve in the darkish observation environment and reference numeral 903 denotes a gradation reproduction curve in the pitch-dark observation environment. Each of these curves 901 to 903 corresponds to a calculation result obtained in case of respectively setting S=1.0, 0.8, 0.67 to the above expression (6).

In a step S604, the gradation conversion unit 116 performs conversion of the pixel value I of the target image in order to obtain the print lightness Lp*. That is, in order to realize the output gradation characteristic shown in FIG. 9, the gradation conversion unit 116 executes the conversion process of the pixel value I by a method as described in the following.

Initially, the gradation conversion unit 116 obtains an input value used for outputting the lightness shown in FIG. 9 from the relationship between the pixel value I and the print lightness L* shown in FIG. 7 as to sixteen gradations with a state that the pixel value I (R, G, B) corresponds 0, 17, 34, 51, 68, 85, 102, 119, 136, 153, 170, 187, 204, 221, 238 and 255 respectively.

For example, in a case of the light observation environment (see curve 901 shown in FIG. 9), the target lightness for the pixel value I=17 becomes 12 judging from the curve 901 shown in FIG. 9. On the other hand, in order to output the lightness of 12, it is understood that the pixel value I has to be set as 9 judging from the relationship between the pixel value I and the print lightness L* shown in FIG. 7. Therefore, the gradation conversion unit 116 converts the pixel value I=17 into 9 and then performs an output.

Next, the gradation conversion unit 116 obtains a conversion value respectively corresponding to the pixel values I of 0 to 255 by an interpolation from the foregoing obtained sixteen gradations.

At this time, as an interpolation method, for example, various methods such as a linear interpolation method and the like can be applied. However, it is desirable to use a smooth interpolation method according to a spline curve or the like. Further, by setting accuracy of an interpolation calculation to eight bits or more, a tone-jump by the interpolation can be prevented.

As above, the color matching process between the display output on the monitor 111 and the print output by the printer 114 is executed by the color matching process unit 117 and then the target image processed by the gradation conversion unit 116 is print processed in the printer 114 by the output image processing unit 118.

Consequently, in the present embodiment, since it is structured that the pixel value (RGB value) of the target image is interpolated (gradation conversion) after obtaining the relationship regarding an interpolation value for the pixel value of structuring the target image, the print output which can take the gradation matching with a display on the monitor 111 can be obtained in the printer 114.

Especially, since it is structured that gradation reproduction areas of the display on the monitor 111 and a print paper in the printer 114 are compressed in linear with the lightness of equally corresponding to human lightness perception, and then a non-linear conversion is performed in accordance with the observation environment of observing an output result obtained in the printer 114, a gradation reproduction which is visually preferable and corresponds to the observation environment can be performed.

Incidentally, it should be noted that the present embodiment may adopt the following structures.

Structural Example 1

Observation-Environment-Discrete Gamma Index and Observation Environment

In the present embodiment, values of the observation-environment-discrete gamma index S are assumed as S=1.0, 0.8, 0.67. However, it is needless to say that the values S are not limited to those values. For example, a conversion expression for obtaining the observation-environment-discrete gamma index S may be defined without setting a constant value for each environment.

In the present embodiment, the observation environment is considered about three patterns. However, it is needless to say that the number of patterns is not limited to the number of patterns in this observation environment.

Structural Example 2

Interpolation Method of Output Gradation Characteristic

In the present embodiment, conversion values corresponding to the pixel values of 0 to 255 are obtained from the sixteen gradation values. However, it is needless to say that the number of gradations is not limited to sixteen, but can be varied, for example, to 32-gradation values or the like in accordance with a memory to be used in actual, accuracy or the like.

Structural Example 3

Gradation Conversion Process

In the present embodiment, the output gradation characteristic is obtained every output of image data by the expression (5), the expression (6) and the interpolation process in the gradation conversion process executed in the gradation conversion unit 116. However, an obtaining of the output gradation characteristic is not limited to this method. For example, it may be structured that the output gradation characteristic is previously calculated on the basis of combination of representative gamma values and the kind of papers to store the calculated characteristic in the memory, and at a time of outputting, the output gradation characteristic is read from the memory for a use of the read characteristic.

Structural Example 4

UI (User Interface)

In the present embodiment, it was structured that a user can set (selection or the like by depression of buttons) the output condition (information regarding observation environment or the like) by using the user interface (UI) 300 shown in FIG. 3. However, it is needless to say that a user interface is not limited to this UI 300. For example, as the UI 300, another user interface such as a menu format UI, a UI in which key words are directly input, or the like can be applied. That is, as the UI 300, such the UI structure, in which the output condition desired by the user can be set, is available.

Structural Example 5

Setting Method of Observation Environment

In the present embodiment, it was structured that the observation-environment-discrete gamma index S is obtained from the kind of papers set by the user. However, it is needless to say that an obtaining of the index S is not limited to this method. For example, the observation-environment-discrete gamma index S may be obtained as described in the following.

Figure 10:
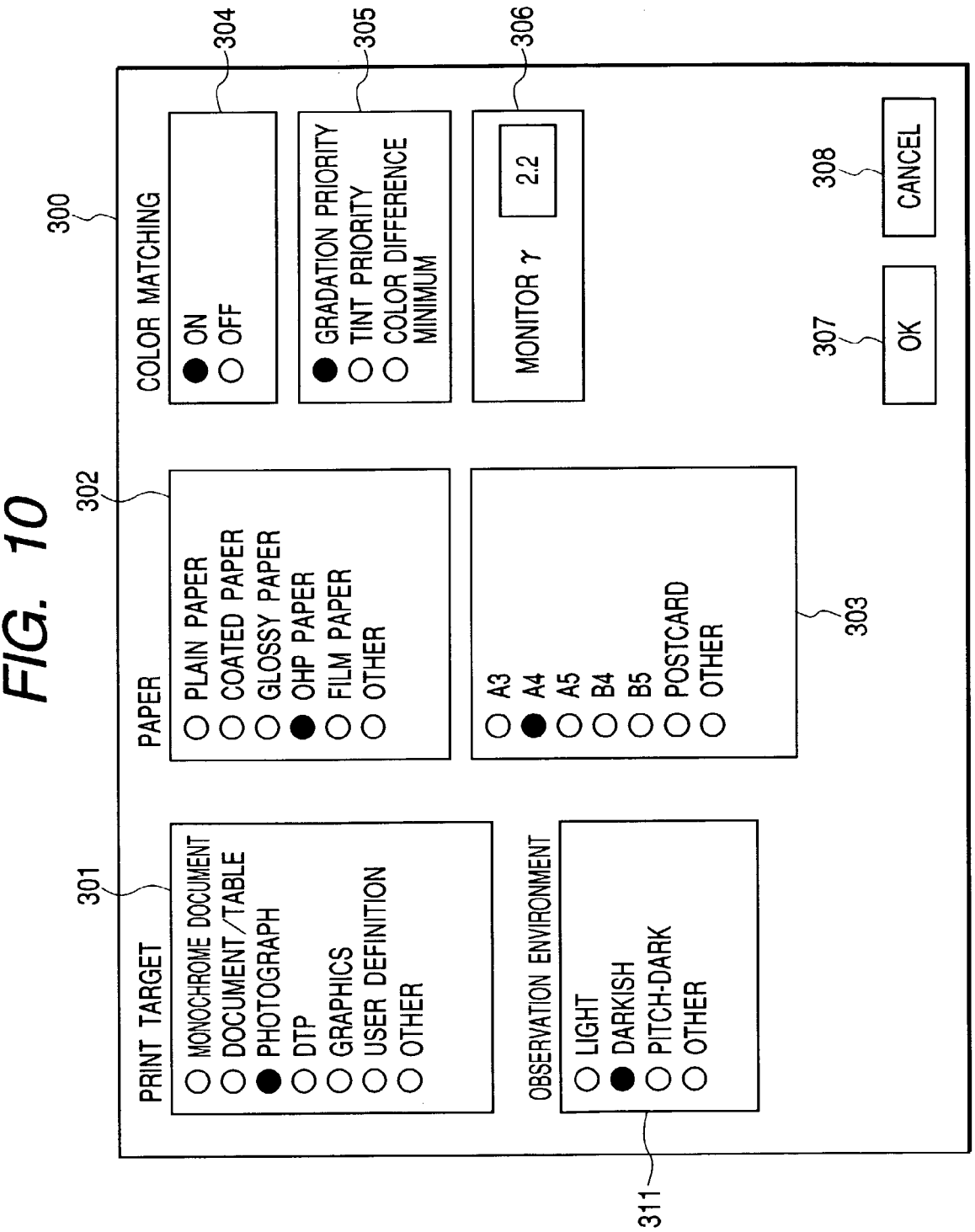
FIG. 10 is a view for explaining another structural example of the UI.

FIG. 10 is a view showing another structural example of the UI 300.

The UI 300 shown in FIG. 10 has such the structure of further having an observation-environment setting unit 311 against the structure of the UI 300 shown in FIG. 3. In the observation-environment setting unit 311, it is possible to set the observation environment (light, darkish, pitch-dark or the like) of observing a print output matter obtained in the printer 114.

The output condition process in case of using the UI 300 shown in FIG. 10 will be briefly explained with reference to the flow chart in FIG. 4. Initially, after executing processes in the steps S401 to S409, the observation-environment-discrete gamma setting unit 119 sets an observation-environment-discrete gamma index S corresponding to the observation environment of observing the print output matter in the step S410 from the contents of the observation environment setting set by the observation-environment setting unit 311.

Figures 11, 12:
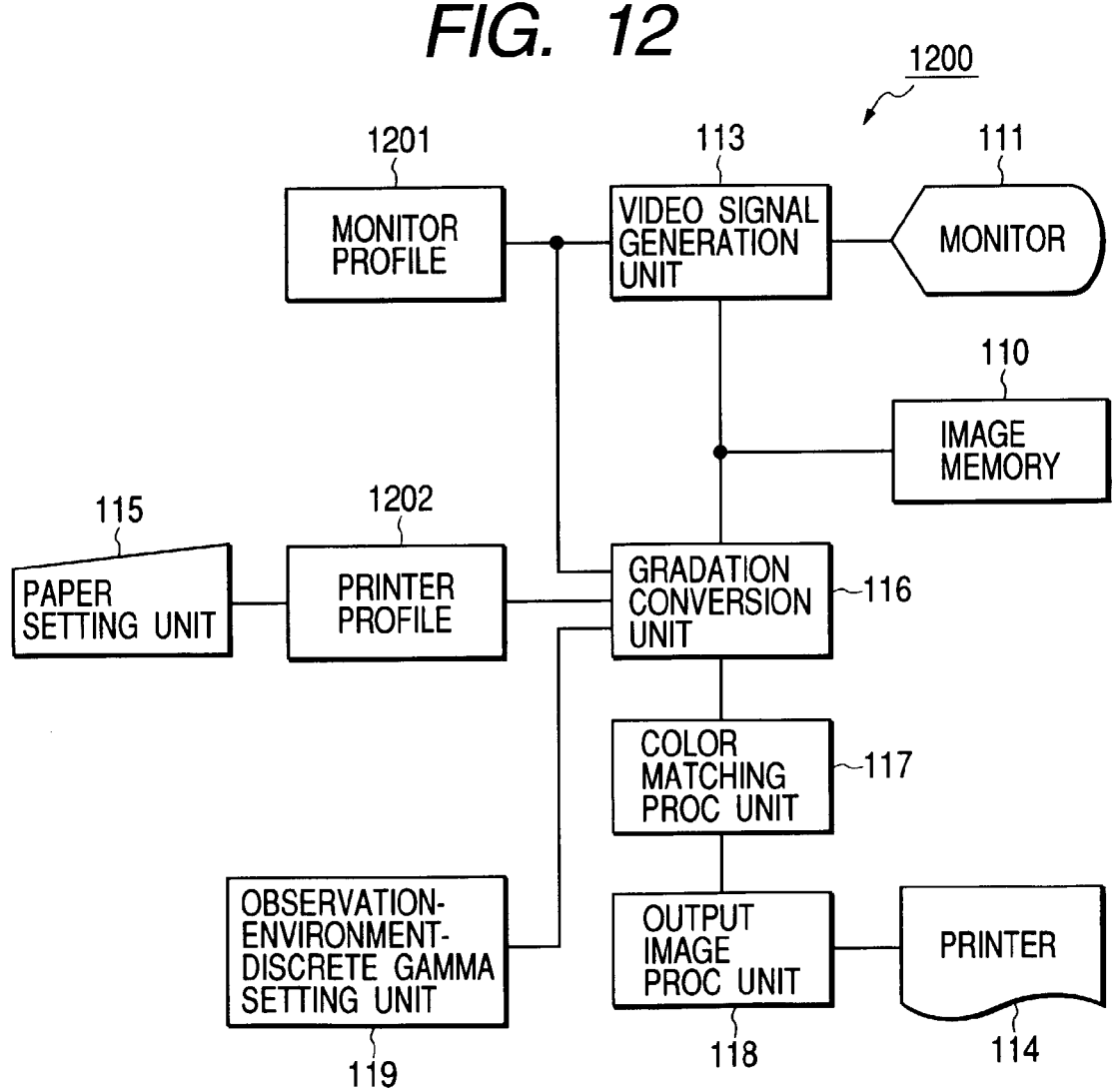
FIG. 11 is a view for explaining the relationship between an observation environment state set by the UI and the observation-environment-discrete gamma index.
FIG. 12 is a block diagram showing the structure of an image processing apparatus according to the second embodiment of the present invention.

FIG. 11 is a view showing an example of the observation-environment-discrete gamma index S set in the step S410 in this case.

For example, in a case where the "darkish" is set in the observation-environment setting unit 311 as shown in FIG. 10, the observation-environment-discrete gamma setting unit 119 obtains a value of 0.8 as the observation-environment-discrete gamma index S from table information shown in FIG. 11 and sets that value.

Second Embodiment

The present invention is applied to, e.g., an image processing apparatus 1200 shown in FIG. 12.

The image processing apparatus 1200 in the present embodiment has such the structure of further having a monitor profile 1201 for holding a display characteristic (gamma value γ and RGB chromaticity or the like of fluorescent material) in the monitor 111 and a printer profile 1202 for holding an output characteristic (Lab value or the like of print color for an input pixel value) every kind of paper which can be used by the printer 114 against the structure of the image processing apparatus 100 shown in FIG. 1.

In the image processing apparatus 1200 in FIG. 12, a portion having the same function as that of the image processing apparatus 100 shown in FIG. 1 is indicated by the same reference numeral and the detailed explanation thereof will be omitted. Only the structure which is different from that of the first embodiment will be concretely explained.

The gamma value γ of the monitor 111 and the RGB chromaticity of the fluorescent material are described in the monitor profile 1201. While, the Lab value of print color for the input pixel value every paper which can be used in the printer 114 is described in the printer profile 1202.

As a general method of describing such the device characteristic (characteristic of the monitor 111 or the printer 114), there provided an ICC (International Color Consortium) profile or the like proposed by Intercolor Consortium.

Therefore, in the image processing apparatus 1200 of the present embodiment, the gradation conversion unit 116 reads the gamma value γ of the monitor 111 from the monitor profile 1201 to obtain the relationship between an input pixel value and display lightness by using the read gamma value and reads the maximum lightness $L_{max}$ and the minimum lightness $L_{min}$ as to a paper set in the printer 114 at the present time from the printer profile 1202 to obtain output lightness $L^{*'}$ corresponding to the observation environment by the expression (6) by using the read maximum lightness and the read minimum lightness. Further, the gradation conversion unit 116 reads an output gradation characteristic from the printer profile 1202 and corrects the input pixel value so as to output the compressed output lightness $L^{*'}$ on the basis of the read output gradation characteristic.

As above, in the present embodiment, since it is structured that the characteristics (input/output characteristics) of the monitor 111 and the printer 114 are obtained from the monitor profile 1201 and the printer profile 1202 and the relationship between a correction value and a pixel value of structuring a target image is obtained by using the obtained characteristics and then the pixel value (RGB value) of the target image is corrected (gradation conversion), a print output which can take a gradation matching with a display on the monitor 111 and is adapted to the observation environment can be automatically obtained in the printer 114 even if, for example, the display on the monitor 111 or paper setting in the printer 114 is changed.

Third Embodiment

Figures 13, 14:
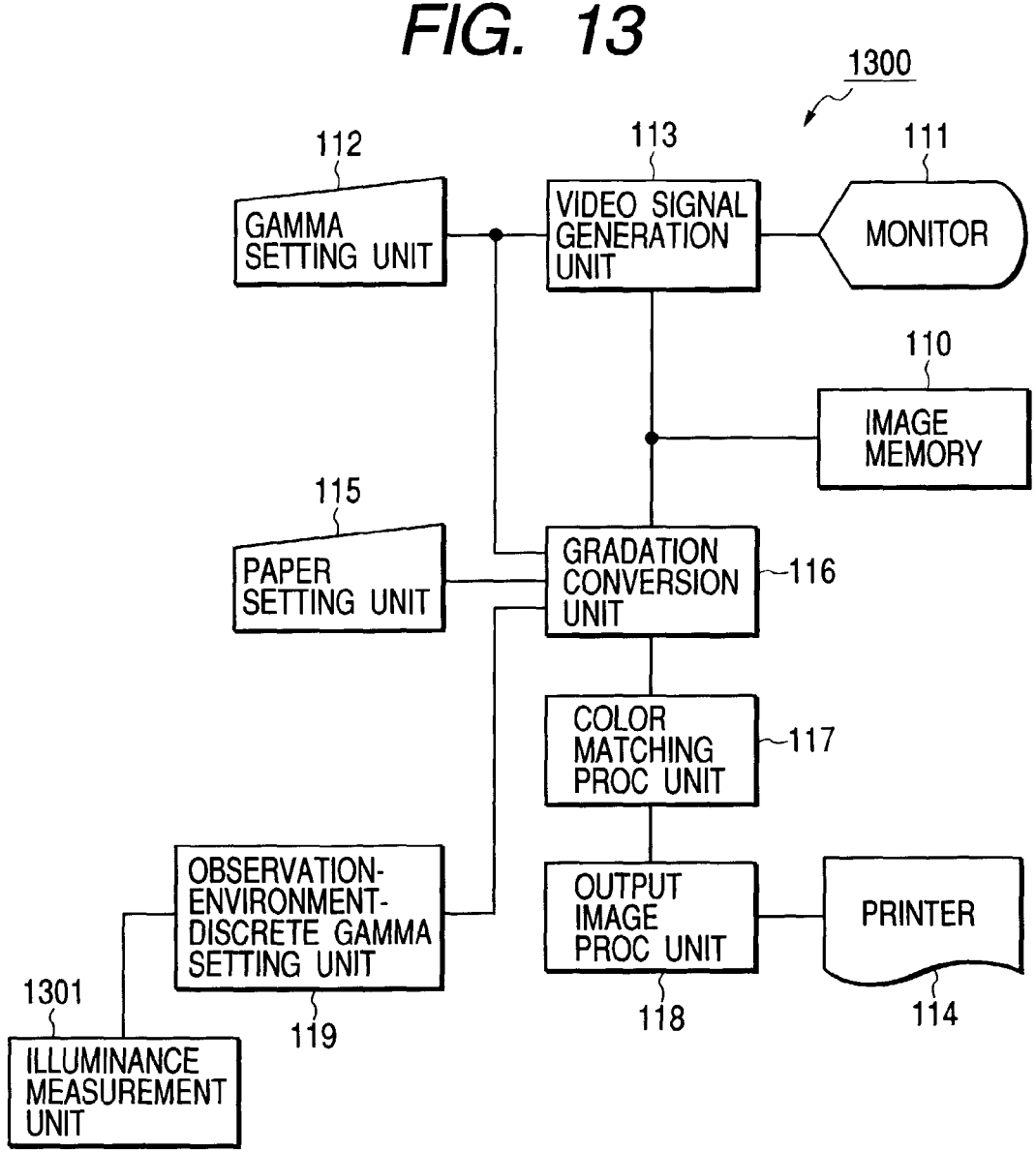
FIG. 13 is a block diagram showing the structure of an image processing apparatus according to the third embodiment of the present invention.
FIG. 14 is a view for explaining the relationship between illuminance of the observation environment and the observation-environment-discrete gamma index in the image processing apparatus.

The present invention is applied to, e.g., applied to an image processing apparatus 1300 shown in FIG. 13.

The image processing apparatus 1300 in the present embodiment has such the structure of further having an illuminance measurement unit 1301 for measuring illuminance of the observation environment against the structure of the image processing apparatus 100 shown in FIG. 1.

In the image processing apparatus 1300 in FIG. 13, a portion having the same function as that of the image processing apparatus 100 shown in FIG. 1 is indicated by the same reference numeral and the detailed explanation thereof will be omitted. Only the structure which is different from that of the first embodiment will be concretely explained.

That is, in the image processing apparatus 1300 in the present embodiment, initially, the illuminance measurement unit 1301 measures illuminance of the environment of observing an output result (print output matter) to be obtained in the printer 114. The observation-environment-discrete gamma setting unit 119 catches a state of observation environment more accurately according to a measured result in the illuminance measurement unit 1301, and an observation-environment-discrete gamma index S is set by using, for example, setting information of the observation-environment-discrete gamma index S as shown in FIG. 14 on the basis of a state of the observation environment at this time.

Figure 15:
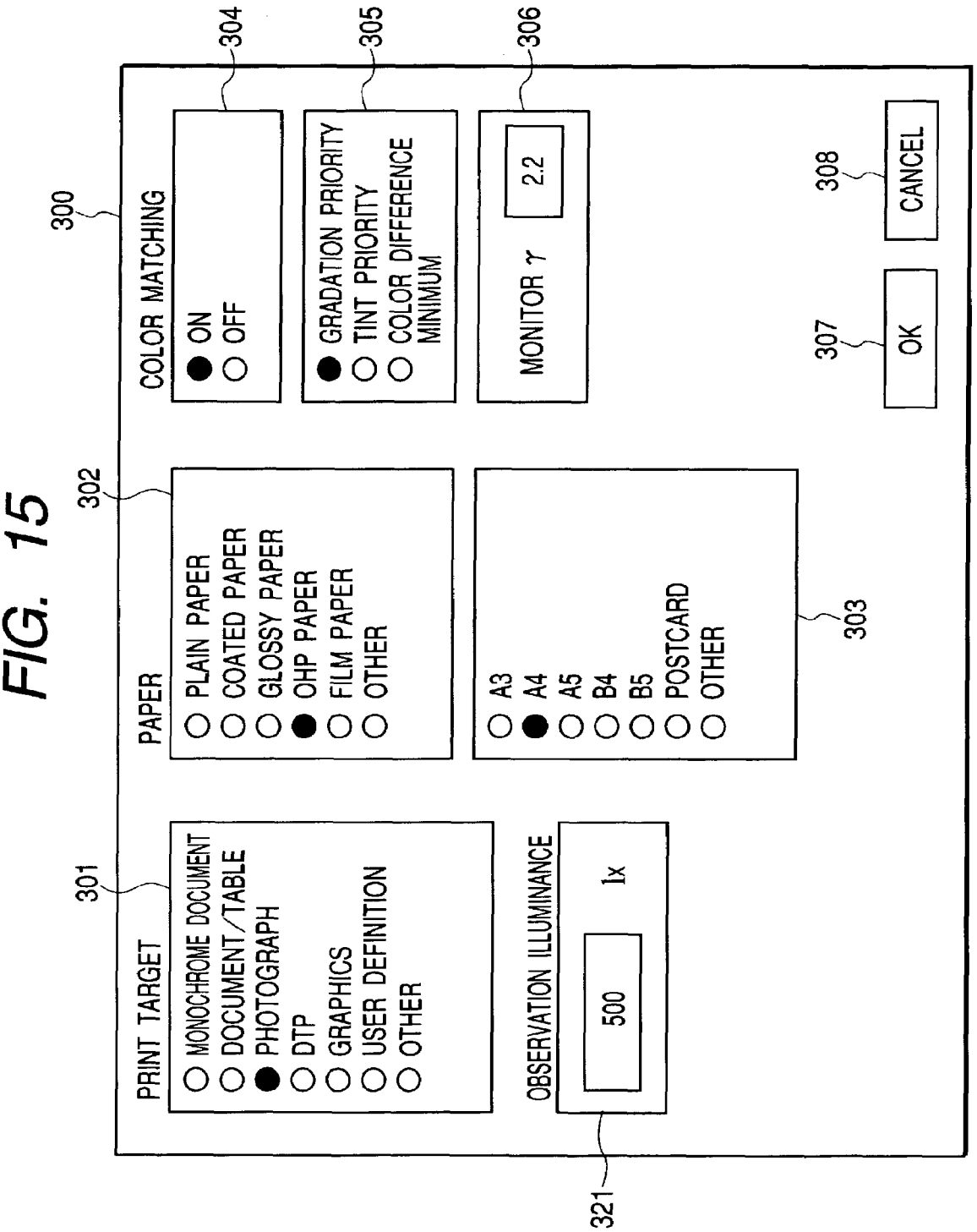
FIG. 15 is a view for explaining another structural example of the user interface in the image processing apparatus.

Here, as a method of setting the observation-environment-discrete gamma index S on the basis of the illuminance of the observation environment, it is not limited to a method depending on the structure of using the above illuminance measurement unit 1301 but may be a method of using a UI 300 shown in FIG. 15.

Concretely, the UI 300 shown in FIG. 15 has such the structure of further having an observation illuminance setting unit 321 against the structure of the UI 300 shown in FIG. 3. In the observation illuminance setting unit 321, illuminance of the observation environment of observing the print output matter can be set. Therefore, a user inputs an illuminance value to the observation illuminance setting unit 321.

The output condition process in case of using the UI 300 shown in FIG. 15 will be briefly explained with reference to the flow chart in FIG. 4. Initially, after executing processes in the steps S401 to S409, the observation-environment-discrete gamma setting unit 119 sets an observation-environment-discrete gamma index S corresponding to the observation environment of observing the print output matter in the step S410 from the contents of the illuminance setting set by the observation illuminance setting unit 321.

At this time, as to the setting of the observation-environment-discrete gamma index S, setting value information of the observation-environment-discrete gamma index S shown in FIG. 14 is used. For example, as shown in FIG. 15, in a case where "500lx" is set for the observation illuminance setting unit 321, the observation-environment-discrete gamma setting unit 119 sets an observation-environment-discrete gamma index S=1.0 corresponding to the "500lx" from the information shown in FIG. 14.

The present invention is applicable to a system composed of plural equipments (e.g., a host computer, an interface equipment, a reader, a printer and the like) or to an apparatus including single equipment (e.g., a copying machine, a facsimile apparatus or the like).

It is needless to say that an object of the present invention can be achieved in a case where a storage medium storing the program codes of software for realizing the functions of a host computer and terminal devices of the first to third embodiments is supplied to a system or an apparatus and then a computer (or CPU or MPU) in the system or the apparatus reads and executes the program codes stored in the storage medium.

In this case, the program codes themselves read from the storage medium realize the functions of the first to third embodiments, and the storage medium storing such the program codes and the corresponded program codes constitute the present invention.

As the storage medium for supplying the program codes, a ROM, a flexible disk, a hard disk, an optical disk, a magnetooptical disk, a CD-ROM, a CD-R, a magnetic tape, a non-volatile memory card or the like can be used.

It is needless to say that the present invention includes not only a case where the functions of the first to third embodiments are realized by the execution of the program codes read by the computer, but also a case where an OS (operating system) or the like functioning on the computer executes all the process or a part thereof according to the instructions of the program codes, thereby realizing the functions of the first to third embodiments.

Further, it is needless to say that the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the first to third embodiments.

Figure 16:
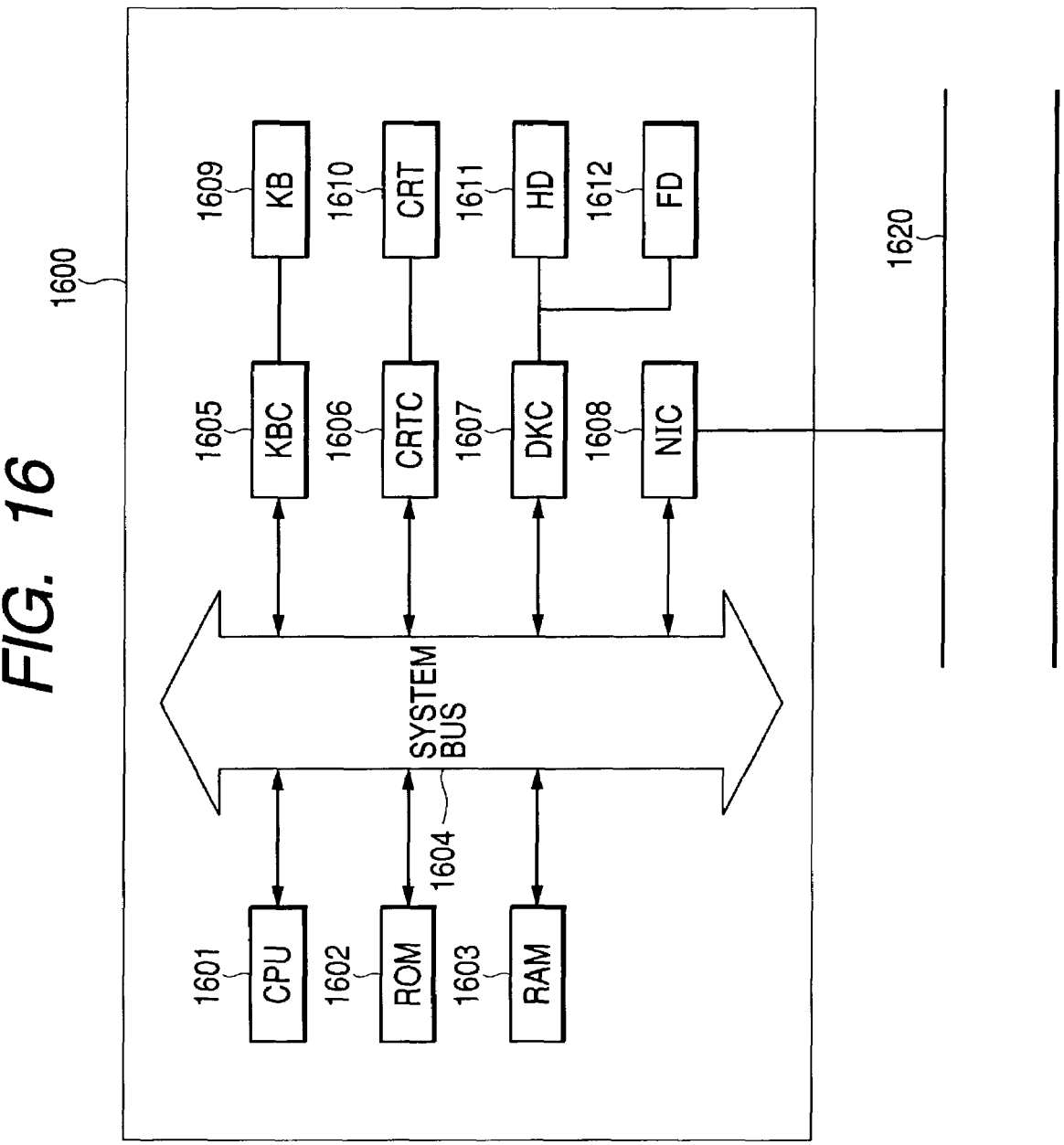
FIG. 16 is a block diagram showing the structure of a computer which reads programs for causing the computer to realize functions of the image processing apparatuses in the first to third embodiments from a computer-readable storage medium and executes the programs.

FIG. 16 is a view showing a function 1600 of the above computer.

As shown in FIG. 16, the computer function 1600 is structured that a CPU 1601, a ROM 1602, a RAM 1603, a keyboard controller (KBC) 1605 of a keyboard (KB) 1609, a CRT controller (CRTC) 1606 of a CRT display (CRT) 1610 functions as a display unit, a disk controller (DKC) 1607 of a hard disk (HD) 1611 and a flexible disk (FD) 1612, and a network interface controller (NIC) 1608 used for connecting to a network 1620 are mutually connected through a system bus 1604 such that the mutual communication can be performed.

The CPU 1601 synthetically controls each of structural units connected to the system bus 1604 by executing software stored in the ROM 1602 or the HD 1611 and software supplied from the FD 1612.

That is, the CPU 1601 performs a control for realizing operations in the first to third embodiments by reading process programs in accordance with a predetermined process sequence from the ROM 1602, the HD 1611 or the FD 1612 and executing the read programs.

The RAM 1603 functions as a main memory or a work area of the CPU 1601.

The KBC 1605 controls an instruction input sent from the KB 1609, a pointing device (not shown) or the like. The CRTC 1606 controls a display on the CRT 1610. The DKC 1607 controls an access to the HD 1611 and the FD 1612 which store a boot program, various applications software, an editing file, a user file, a network management program, a predetermined process program in the present embodiments and the like.

The NIC 1608 performs an interactive communication of data with apparatuses or a system on the network 1620.

As explained above, in a case where a target image, which was output by a first output means (monitor or the like) having a first gradation reproduction area, is corrected and then the corrected target image is output by a second output means (printer or the like) having a second gradation reproduction area which is different from the first gradation reproduction area, it is structured that a correction process (gradation conversion process or the like) is executed to the target image on the basis of information regarding the environment of observing an output result (printed material or the like) obtained in the second output means.

Thus, since an appropriate correction process corresponding to the environment of actually observing the output matter is executed and then the appropriately corrected output matter is output, for example, an output image having the gradation adapted to human visual perception which varies in accordance with the observation environment can be provided.

Therefore, in case of observing the output image, an image observation with a good state can be always performed regardless of variation of the observation environment or human visual perceptive characteristic.

What is claimed is:

1. An image processing apparatus which performs a correction process on a target image displayed by first output means having a first gradation reproduction range, comprising:

second output means having a second gradation reproduction range for printing the corrected target image;

gamma setting means for setting a gamma value of said first output means;

paper setting means for setting a kind of a paper on which the target image is to be printed;

gradation obtaining means for obtaining a gradation characteristic corresponding to one of at least three brightness states for observation of the target image printed on the paper from an ICC-compliant printer profile corresponding to said second output means;

gamma obtaining means for obtaining the gamma value from an ICC-compliant monitor profile corresponding to said first output means;

brightness obtaining means for obtaining the maximum and minimum brightness for the paper from the ICC-compliant printer profile in accordance with the setting by said paper setting means; and processing means for performing a correction process to the target image based on the gradation characteristic obtained by said gradation obtaining means, the gamma value obtained by said gamma obtaining means, and the maximum and minimum brightness obtained by said brightness obtaining means.

2. A computer-readable storage medium which stores a program to execute an image processing method which is to perform a gradation conversion process between first output means and second output means respectively having different gradation reproduction ranges, said method comprising:

a gamma setting step for setting a gamma value of said first output means;

a paper setting step for setting a kind of a paper on which the target image is to be printed;

a gradation obtaining step for obtaining a gradation characteristic corresponding to one of at least three brightness states for observation of the target image printed on the paper from an ICC-compliant printer profile corresponding to said second output means;

a gamma obtaining step for obtaining the gamma value from an ICC-compliant monitor profile corresponding to said first output means;

a brightness obtaining step for obtaining the maximum and minimum brightness for the paper from the ICC-compliant printer profile in accordance with the setting in said paper setting step; and a processing step of performing a correction process to the target image based on the gradation characteristic obtained in said gradation obtaining step, the gamma value obtained by said gamma obtaining step, and the maximum and minimum brightness obtained by said brightness obtaining step.

3. An image processing apparatus according to claim 1, further comprising color matching means for performing a color matching process to the target image after the gradation conversion process by said processing means, so as to color match the target image displayed by said first output means to the target image printed by said second output means.

4. An image processing apparatus according to claim 3, wherein said color matching means is turned ON or OFF, said gamma setting means sets the gamma value, and said paper setting means sets the kind of paper on a user interface provided by a printer drive.

5. A computer-readable storage medium according to claim 2, further comprising a color matching step for performing a color matching process to the target image after the gradation conversion process by said processing means, so as to color match the target image displayed by said first output means to the target image printed by said second output means.

6. A computer-readable storage medium according to claim 5, wherein said color matching step is turn ON or OFF, said gamma setting step sets the gamma value, and said paper setting step sets the kind of the paper on a user interface provided by a printer driver.

* * * * *